Patented Sept. 26, 1944

2,359,274

UNITED STATES PATENT OFFICE 2,359,274

PROCESSES OF COLOR PHOTOGRAPHY USING AZOLE COLOR FORMERS

Cyril D. Wilson, Metuchen, N. J., assignor to E. I. du Pont de Nemours & Company, Wilmington, Del., a corporation of Delaware No Drawing. Application February 11, 1943, Serial No. 475,498

5 Claims. (Cl. 95—6)

This invention relates to color photography. More particularly it relates to the production of dyestuff images utilizing dye intermediates which contain an acyclic methylene group which is activated by a ring ternary nitrogen atom and an acyclic carbonyl group. The invention also relates to photographic elements, color-yielding colloid layers, colloid compositions and developer compositions which contain such dye intermediates.

The subject matter of this application has been divided out of my copending application Serial No. 303,873 now United States Patent 2,323,504 of which this application is a continuation-in-part.

An object of this invention is to contribute to the art of color photography. A further object is to provide new processes for the production of dye images. A still further object is to provide a new use for heterocyclic nitrogen compounds having an acyclic substituent containing a group of the formula —CH$_2$CO— attached through the methylene radical to an alpha carbon atom of the heterocyclic ring. A further object is to provide a new class of dye intermediates and color formers which can be economically made from available chemical compounds. Still further objects are to provide new photographic elements and compositions which contain such dye intermediates.

It is known that dye intermediates or color formers which contain a methylene group activated by two keto groups or by doubly bonded nitrogen and an intra cyclic complex group are useful in processes of color photography wherein dye images are produced simultaneously with the development of silver images. Such compounds are typified by the acetoacetic acid esters of the formula RCO—CH$_2$—COOR, wherein R is a hydrocarbon radical, acetoacetic acid amides of the general formula RCO—CH$_2$CONR'R'', wherein R is a hydrocarbon radical and —NR'R'' is a secondary or tertiary amine radical and pyrazolone.

It has now been found that a novel class of chemical compounds which do not contain a methylene group activated in the above manner form useful dye intermediates or color formers which form satisfactory dye images by the color coupling development of reducible silver salt images. The novel compounds contain a heterocyclic nucleus having a ternary nitrogen atom attached to a ring carbon atom which is in turn attached to the carbon atom of an acyclic —CH$_2$—CO— radical. The carbonyl radical may in turn be attached to a hydrocarbon radical or a heterocyclic radical or an alkoxy group.

The above and other objects are accomplished by the preparation and use in colloid compositions or layers and processing solutions of heterocyclic nitrogen compounds having a ring ternary nitrogen atom and adjacent ring carbon atom which in turn is attached to a —CH$_2$CO— group through the methylene radical.

In a more limited sense the invention is concerned with the preparation and use in colloid compositions or layers and processing solutions of substituted azoles which contain a —CH$_2$CO— group attached to a carbon atom in the alpha position to the ternary nitrogen atom of the azole nucleus.

In one embodiment of the invention the compounds utilized may be represented by the general formula:

(1)

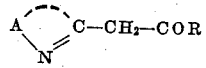

wherein A constitutes the atoms necessary to complete an azole nucleus in which N and C are members of the azole ring, e. g., an oxazole, thiazole, selenazole, or tellurazole and R represents an aliphatic, cycloaliphatic, aromatic, heterocyclic, or mixed hydrocarbon radical and their substitution products.

In a more preferred form of the embodiment just described, the azole contains two or more rings. These compounds may be represented by the general formula:

(2)

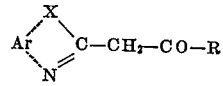

wherein Ar is an ortho divalent aromatic hydrocarbon nucleus, X is a chalcogen (defined in U. S. P. 2,323,503 and the Jour. Am. Chem. Soc. vol. 63, page 889), c. g., oxygen, sulfur, selenium, and tellurium, and RCO is an acyl radical. The nucleus Ar may have one or more hydrogen atoms replaced by substituent groups including hydrocarbon radicals, acyl groups from carbonyl compounds, alkoxy groups, and other groups which do not react with acylacetic acid esters.

Among the suitable hydrocarbon radicals are straight chain, iso, and branched chain alkyl radicals, alkyl groups of 1 to 20 and more carbon atoms including methyl, ethyl, isopropyl, 2-ethylhexyl, dodecyl, octadecyl, etc. groups; cycloalkyl groups, e. g., cyclohexyl, methylcyclohexyl, ethylcyclohexyl, menthyl, etc.; aryl, e. g., benzyl, naphthyl, chlorphenyl, bromnaphthyl; aralkyl, e. g., benzyl, methylbenzyl, menaphthyl, etc., carboxylic acyl, including aliphatic acyl, e. g., acetyl, butyryl, lauroyl, stearoyl, caproyl, etc., heterocyclic acyl, e. g., thienoyl, nicotinoyl, isonicotinoyl, etc., cyclic acyl, e. g., benzoyl, naphthoyl, etc., preferably containing at least 6 carbon atoms, alkoxy, e. g., methoxy, ethoxy. The benzene nuclei of the above, furthermore, may have one or more water insolubilizing groups, e. g., hydrocarbon alkoxy, halogen, e. g., chlorine, bromine; nitro, amino, or water solubilizing groups such as hydroxyl, carboxylic, sulfonic, etc. groups.

The compounds wherein X represents oxygen and sulfur constitute the preferred embodiments hereof. The dyes formed are of good color and stability. The relative ease of their preparation and the fact that the starting materials or intermediates are more readily available are also of significance.

In preparing certain of the novel color formers hereof, one mol of an acylacetic acid ester is reacted with about one mol of an azole-yielding amino or amido compound in an inert solvent medium under reflux conditions until condensation occurs. The mixture is cooled, filtered, and distilled or recrystallized depending upon its nature.

The compounds may be prepared by reacting a carboxylic acylacetic acid ester with an equivalent amount of an aromatic amino compound containing in an ortho position thereto an —OH, —SH, —SeH, or —TeH group. Their preparation may be exemplified in terms of the following equation wherein ortho amino-phenol is reacted with ethyl dodecanoyl acetate:

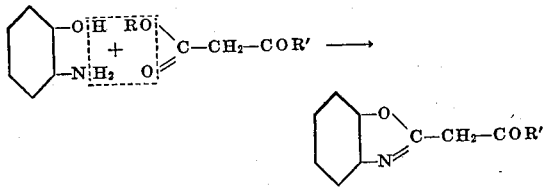

wherein R is an ethyl radical and R'CO— is a dodecanoyl radical.

The reaction may be accomplished by dissolving or suspending the two reactants in an inert organic solvent, preferably a volatile hydrocarbon solvent such as xylene, and heating the mixture under reflux for several hours until ring closure obtains. The mixture is cooled, filtered and the product recrystallized or distilled depending upon its nature.

The acyl radicals of the acylacetic acid esters used are not limited to any one type of compounds. Thus, they may be derived from, or correspond to, various aliphatic, isocyclic and heterocyclic monobasic, monocarboxylic acids. Among the radicals falling within this class mention may be made of the following: acetyl, butyryl, decanoyl, benzoyl, 4-chlorobenzoyl, 4-nitrobenzoyl, alphanaphthoyl, furoyl, thienoyl, picolinoyl, nicotinoyl and isonicotinoyl. Furthermore, it is to be understood that when the acyl radicals contain benzene nuclei the latter may be substituted by various non-water solubilizing groups such as hydrocarbon alkoxy, halogen, nitro and amino groups and/or water solubilizing groups such as sulfonic and sulfonate and carbonyl, and carboxylate groups. The acyl acetic acid esters may contain up to 24 carbon atoms or more. The higher molecular weight radicals are advantageous in some cases because the resulting color formers are more immobile than when lower radicals are present. As examples of representative suitable esters, mention is made of ethyl acetoacetate, methyl acetoacetate, ethyl dodecoylacetate, ethyl benzoylacetate, ethyl picolinylate, ethyl para-nitro-benzoyl acetate.

In another embodiment of the invention the compounds have the general formula:

(3) 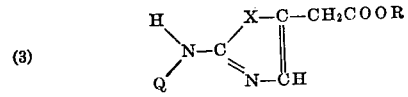

wherein X is an oxygen, sulfur, selenium or tellurium atom, R is an aliphatic hydrocarbon radical and Q is hydrogen or a hydrocarbon carboxylic acyl radical. R may thus be a primary, secondary or branched chain alkyl radical containing from 1 to 24 carbon atoms or cycloaliphatic, e. g., cyclohexyl, cyclopentyl, abietyl, tetrahydroabietyl, naphthenyl, phenyl, etc., and Q may be an acyl radical corresponding to fatty acids having from 1 to 24 carbon atoms, benzoyl, nitrobenzoyl, chlorobenzoyl, etc.

The compounds of Formula 3 wherein Q is hydrogen may be prepared by reacting a 4-halogeno acetoacetic acid ester with thiourea in the presence of an organic solvent at a temperature below 100° C. The product is neutralized with a weak alkaline solution and recrystallized from an organic solvent. These products may be reacted with an acylating agent to form amides with the amino group.

The methylene azoles may be incorporated in developer solutions by dissolving them in a suitable solvent and adding it to the solution with stirring. They may be added to emulsions, e. g., silver halide emulsions in a similar manner. In some cases the use of dispersing agents such as alkylated naphthalene sulfonates, higher aliphatic fatty alcohol sulfates, higher aliphatic sulfonates, mineral oil sulfonates, Turkey red oil, etc. is advantageous.

The invention will be further illustrated but is not intended to be limited by the following examples:

*Example I.*—One mol of the ethyl aceto-acetate is dissolved in xylene and one mol of o-aminothiophenol is added to the boiling mixture. The mixture is refluxed for 2 to 3 hours at a temperature of about 140° C., cooled, filtered, and the resulting product purified.

*Example II.*—One mol of ethyl benzoyl acetate is dissolved in xylene and one mol of o-aminophenol is added with stirring to the boiling mixture. The reaction mixture is heated under reflux at a temperature of 200° C. for several hours. The solution is chilled and the crystals recrystallized.

In place of the specific amino compounds of the above examples may be substituted various other aromatic compounds containing an amino group and a reactive hydrogen atom attached to an atom from the oxygen family of elements. Thus, o-amino bromophenol, o-amino chlorphenol, o-amino bromothiophenol, o-amino chlorothiophenol, o-amino nitrophenol, o-amino selenophenol, o-amino-tellurophenol, etc., may be substituted in similar amounts.

*Example III.*—One mol of 4-bromoacetoacetic acid ethyl ester is mixed with one mol of thiourea in dry ethanol and heated on a steam bath for several hours. It is neutralized with sodium carbonate, diluted with water, filtered and recrystallized from benzene and ether. It has a melting point of 94° C.

*Example IV.*—To the ethyl-4-(2-amino thiazolyl) acetate of Example III in benzene is added a mol of benzoyl chloride. The mixture is heated for several hours. The solution is washed with excess 10% sodium carbonate solution and the benzene evaporated. The product is an oil.

Various types of esters can be substituted for the specific ones set forth in the above examples. Thus, the esters from methyl, isopropyl, butyl, hexyl, octyl, dodecyl, etc., cyclohexyl, abietyl, naphthenyl, benzyl, etc., alcohols may be used. In general, the higher molecular weight alcohols are preferred because they render the color formers less mobile in the emulsion layers.

As examples of suitable solvents which may be substituted for the xylene are petroleum, benzene, toluene, etc.

The compounds or mixtures are introduced into photographic emulsion layers or developer solutions as previously described and dyes produced therefrom by some suitable treatment such as exposure and development with a color coupling developer or treatment with a diazo compound followed by localized bleaching of the dye in the image areas. In the case of emulsions the color formers are dissolved in alkali or carbonate solutions. Small amounts of organic solvents, e. g., alcohol or acetone may be used. The remaining examples are directed to their use in various photographic compositions and to processes of developing dyed images utilizing such compounds.

*Example V.*—To 100 ccs. of 2% by weight aqueous gelatin solution is added a solution consisting of 8 ccs. of ethyl alcohol and 1 gram of the compound having the formula:

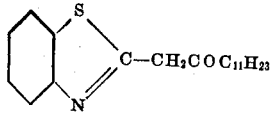

the total weight of the combined solution is then brought to about 150 grams with water and then the mixture is added to 100 grams of a gelatino-silver halide emulsion and mixed thoroughly. The resulting emulsion may then be coated upon a suitable support such as paper, glass or a cellulose derivative base, or upon another photographic emulsion layer which may or may not be another color-forming dye component. After exposure directly in a camera or by printing through appropriate color records, the film is developed in a non-color forming developer and reversed. The reversed image is then developed by means of an alkaline solution of diethyl-p-phenylenediamine, whereupon a light red-orange dye of good strength and color forms in situ with metallic silver.

Furoylaceto-p-chlor-o-phenetidine gives similar results when substituted in similar amounts.

*Example VI.*—To 100 ccs. of 2% by weight aqueous gelatin solution is added a solution consisting of 8 ccs. of ethyl alcohol and 1 gram of the compound having the formula:

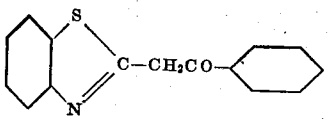

The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example V. After exposure, the photographic element is developed in an alkaline solution containing diethyl-p-phenylene diamine whereupon a red-orange dye of good tinctorial strength is formed which is fully revealed by removal of the silver image with Farmer's reducer.

*Example VII.*—To 100 ccs. of 2% by weight aqueous gelatin solution is added a solution consisting of 8 ccs. of ethyl alcohol and 1.5 grams of the compound having the formula:

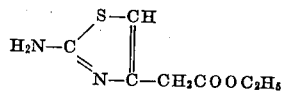

together with a 20% aqueous caustic soda solution in an amount equal to 2 mols of alkali for each mol of the compound. The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example I. After exposure the photographic element is developed in an alkaline solution containing dimethyl-p-phenylene diamine, whereupon a yellow dye light in color and of good tinctorial strength is formed.

*Example VIII.*—To 100 ccs. of 2% by weight aqueous gelatin solution consisting of 8 ccs. of ethyl alcohol and 1.5 grams of the compound having the formula:

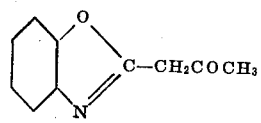

together with a 20% aqueous caustic soda solution in an amount equal to 2 mols of alkali for each mol of the compound. The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example V. After exposure the photographic element is developed in an alkaline solution containing dimethyl-p-phenylene diamine, whereupon a greenish yellow dye, light in color and of good tinctorial strength is formed.

The 6-nitro derivative, which has a melting point of 255–6° C., forms an orange dye upon development.

*Example IX.*—To 100 ccs. of a developer having the following composition:

Diethyl-p-phenylenediamine
  hydrochloride ____ g__  2
Sodium sulfite (anhydrous) _____ g__  5
Sodium carbonate (anhydrous) _____ g__  20
Water _____ cc__ 1000 are added from 0.1 to 1.0 gram of omega acetyl-2-methylbenzothiazole (compound of Example I) dissolved in a few ccs. of ethyl alcohol. An exposed photographic element containing exposed silver salts is then developed in aforedescribed solution.

The color formers or dye intermediates described herein which are non-migratory may be used in various types of colloids. They may be used with gelatin, agar agar, cellulose derivatives, synthetic resins which have gelling characteristics or are imparted thereto by suitable agents, and coated onto suitable supports to form color-yielding layers.

The color formers hereof may be used with various types of emulsions and are especially useful in the development of gelatino silver halide emulsions such as silver chloride, silver bromide, silver chloro-bromide, silver bromide-iodide, etc. emulsions. They may be used in color development processes of latent images, reversed or bleached silver images and form dyes in situ with metallic silver. Upon removal of the silver developed, transparent dye images remain.

The dye intermediates of this invention which are non-migratory or immobile need not be placed directly in the light-sensitive layer but may be used in separate layers which are in operative association therewith. Thus, they can be incorporated in a separate gelatin or other water-permeable colloid layer which is superimposed on a light-sensitive layer or spaced therefrom by means of thin water-permeable colloid layers. In addition, the immobile compounds of this invention may be incorporated in color-yielding elements of the type set forth in application Ser. No. 370,195 and application Ser. No. 370,194, filed December 14, 1940. To be more specific, such high molecular weight dye intermediates can be used in colloid layers in elements free from photosensitive strata or containing such strata in a position that they do not coact with the colloid layer.

The dye intermediates used in this invention are not limited in their utility to any one process of color photography. They are suitable for dye coupling development with p-phenylenediamine derivatives, and by suitably controlling the molecular weights of the products, they may be used in the color developer or in the photographic emulsion. Furthermore, the dye components of this invention couple with diazo compounds, e. g. tetrazotized dianisidine, so that they are therefore suitable for transforming into azo dyes, followed or not by differential bleaching in the presence of silver images as is known in the art. They may be used in multilayer or single layer films.

The preferred color developing agents used in the processes of dye coupling development are derivatives of p-phenylenediamine and particularly the asymmetric dialkyl p-phenylenediamines, e. g., p-aminodimethylaniline, p-aminodiethylaniline, p-aminodibutylaniline, etc. Other developing agents which may be used include p-phenylenediamine itself, p-methylaminoaniline, p-ethylaminoaniline, p-aminophenol, N,N-diethyl-o-phenylenediamine, chloro-p-phenylenediamine, 1,2,5-toluylenediamine, 2-amino-5-diethyl-aminotoluene, N-p-aminophenylpiperidine, N-methyl-N-hydroxyethyl-p-phenylene diamine, N-b u t y l -N-hydroxyethyl-p-phenylenediamine, beta- g a m m a -dihydroxypropyl-p-phenylenediamine, 2-amino-5-(N-beta-hydroxy-ethyl-N-butyl) aminotoluene and its dihydrochloride, etc. These aromatic amino-developing agents may be used in the form of their salts, which may be either inorganic or organic. The salts are in general more stable than the free bases. As examples of suitable salts mention is made of the hydrochloride, sulfates, acetates, etc.

As many apparently widely different embodiments of this invention may be made without departing from the spirit and scope thereof it is to be understood that I do not limit myself to the specific embodiments herein except as defined by the appended claims.

I claim:

1. A color-yielding element comprising a support having superimposed thereon at least one water-permeable colloid layer containing as a dye intermediate a compound of the formula:

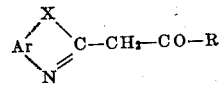

wherein Ar is an ortho divalent aromatic hydrocarbon nucleus, X is a chalcogen and RCO is an acyl radical.

2. A color-yielding element comprising a support having superimposed thereon at least one water-permeable colloid layer containing as a dye intermediate a compound of the formula:

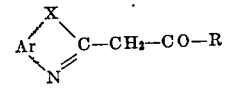

wherein Ar is an ortho divalent aromatic hydrocarbon nucleus, X is a chalcogen and RCO is an acyl radical, which is of sufficient molecular weight as to be immobile in said layer.

3. A color-yielding element comprising a support having superimposed thereon at least one water-permeable colloid layer containing as a dye intermediate a compound of the formula:

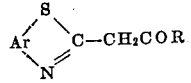

wherein Ar is an ortho divalent aromatic hydrocarbon radical and RCO is an acyl radical.

4. A process of color photography which comprises reducing a light sensitive silver salt image with a color coupling developing agent in the presence of a compound of the formula:

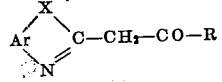

wherein Ar is an ortho divalent aromatic hydrocarbon nucleus, X is a chalcogen and RCO is an acyl radical.

5. A photographic developer solution containing an aromatic primary amino color developing agent and a compound of the formula:

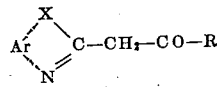

wherein Ar is an ortho divalent aromatic hydrocarbon nucleus, X is a chalcogen and RCO is an acyl radical.

CYRIL D. WILSON.